US012784689B2

(12) United States Patent
Lee et al.

(10) Patent No.: US 12,784,689 B2
(45) Date of Patent: Nov. 3, 2026

(54) DISPLAY DEVICE

(71) Applicant: LG Display Co., Ltd., Seoul (KR)

(72) Inventors: Soyi Lee, Paju-si (KR); JongBeom Lee, Paju-si (KR); Seeun Kim, Seoul (KR); Jaemin Park, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/921,258

(22) Filed: Oct. 21, 2024

(65) Prior Publication Data

US 2025/0157407 A1 May 15, 2025

(30) Foreign Application Priority Data

Nov. 10, 2023 (KR) ........................ 10-2023-0155471

(51) Int. Cl.
*G09G 3/3258* (2016.01)

(52) U.S. Cl.
CPC ... *G09G 3/3258* (2013.01); *G09G 2320/0653* (2013.01); *G09G 2330/026* (2013.01); *G09G 2330/027* (2013.01); *G09G 2360/141* (2013.01); *G09G 2360/147* (2013.01)

(58) Field of Classification Search
CPC ..... G09G 3/30–3291; G09G 2330/026; G09G 2330/027; G09G 2360/141; G09G 2360/147; G09G 2320/0653
See application file for complete search history.

(56) References Cited

U.S. PATENT DOCUMENTS

2013/0093729 A1* 4/2013 Cheng .................. G06F 3/0412 250/206
2021/0097927 A1* 4/2021 Matsueda ............ G09G 3/3241
2021/0335238 A1* 10/2021 Song ...................... H10K 71/20

FOREIGN PATENT DOCUMENTS

KR 10-2021-0085025 A 7/2021

* cited by examiner

*Primary Examiner* — Hang Lin
(74) *Attorney, Agent, or Firm* — Morgan, Lewis & Bockius LLP

(57) ABSTRACT

A display device includes a display panel including a plurality of sub pixels. At least one of the sub pixels may include a light emitting diode configured to emit light, a light emitting circuit configured to drive the light emitting diode, and a sensing circuit including a photo sensing transistor configured to sense light emitted from the light emitting diode. Accordingly, the light intensity of the sub pixel may be sensed by the sensing circuit in real time to compensate for a luminance deviation between the plurality of sub pixels.

19 Claims, 8 Drawing Sheets

DISPLAY DEVICE

CROSS-REFERENCE TO RELATED APPLICATIONS

This application claims the priority of Korean Patent Application No. 10-2023-0155471, filed on Nov. 10, 2023, in the Korean Intellectual Property Office, the disclosure of which is incorporated herein by reference.

BACKGROUND

Field

The present disclosure relates to a display device, and more particularly, to a display device using a light emitting diode (LED).

Description of the Related Art

Display devices used for a monitor of a computer, a television, a cellular phone, or the like include an organic light emitting display (OLED) device which is a self-emitting device, a liquid crystal display (LCD) device which requires a separate light source, and the like.

An applicable range of a display device is diversified to include, for example, personal mobile devices as well as monitors of computers and televisions, and a display device with a large display area and a reduced volume and weight is being studied.

Further, recently, a display device including a light emitting diode (LED) is attracting attention as a next generation display device. Since the LED is formed of an inorganic material, rather than an organic material, reliability is excellent so that a lifespan thereof is longer than that of the liquid crystal display device or the organic light emitting display device. Further, the LED has a fast lighting speed, excellent luminous efficiency, and a strong impact resistance so that it can allow the display device to exhibit excellent stability and to display an image having a high luminance.

SUMMARY

An object of the present disclosure is to provide a display device which is capable of directly sensing and compensating for light emitted from a light emitting diode.

Another object of the present disclosure is to provide a display device with a sensing circuit embedded in a sub pixel to sense light.

Still another object of the present disclosure is to provide a display device which is capable of compensating for a luminance deviation between sub pixels in real time.

Still another object of the present disclosure is to provide a display device which can easily compensate for a luminance deviation while simplifying a structure of a sub pixel.

Still another object of the present disclosure is to provide a display device capable of compensating for a luminance deviation due to a threshold voltage deviation of a driving transistor and a deterioration of a light emitting diode.

Objects of the present disclosure are not limited to the above-mentioned objects, and other objects, which are not mentioned above, can be clearly understood by those skilled in the art from the following descriptions.

To achieve these objects and other advantages of the present disclosure, as embodied and broadly described herein, a display device may include a display panel including a plurality of sub pixels, wherein at least one of the sub pixels may include a light emitting diode configured to emit light, a light emitting circuit configured to drive the light emitting diode, and a sensing circuit including a photo sensing transistor configured to sense light emitted from the light emitting diode. Accordingly, the light intensity of the sub pixel may be sensed by the sensing circuit in real time to compensate for a luminance deviation between the plurality of sub pixels.

According to another aspect of the present disclosure, a display device may include a substrate, a photo sensing transistor on the substrate, a reflective layer on the photo sensing transistor, and a light emitting diode on the reflective layer. The reflective layer may include an opening overlapping the photo sensing transistor. Accordingly, the photo sensing transistor may sense light emitted from the light emitting diode through the opening in the reflective layer.

Other detailed matters of example embodiments are included in the detailed description and the drawings.

According to example embodiments of the present disclosure, light emitted from the light emitting diode may be directly sensed to be compensated.

According to example embodiments of the present disclosure, a sensing circuit configured to sense light may be embedded in the sub pixel to directly sense light emitted from the light emitting diode.

According to example embodiments of the present disclosure, a luminance deviation between sub pixels may be compensated.

According to example embodiments of the present disclosure, the luminance deviation due to the threshold voltage deviation of the driving transistor and the deterioration of the light emitting diode may be compensated without a complex internal compensation circuit.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
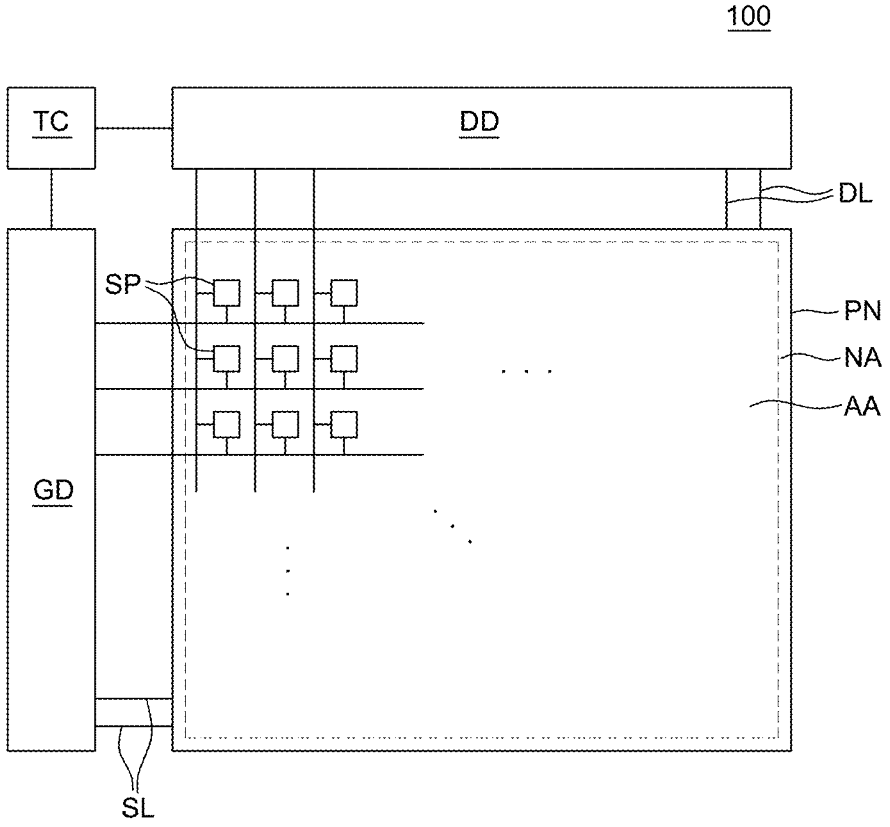
FIG. 1 is a schematic diagram of a display device according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, sizes, ratios, angles, numbers, and the like illustrated in the accompanying drawings for describing various example embodiments of the present disclosure, are merely given by way of example. Therefore, the present disclosure is not limited to such illustrated details in the drawings.

In the following description, where a detailed description of a relevant known function or configuration may unnecessarily obscure aspects of the present disclosure, a detailed description of such a known function or configuration may be omitted or be briefly discussed.

Where a term like "include," "have," or "consist of" is used, one or more other elements may be added unless the term is used with a more limiting term, such as "only" or the like. An element described in a singular form may include a plurality of elements, and vice versa, unless the context clearly indicates otherwise.

In construing an element, the element should be construed as including an error or tolerance range even where no explicit description of such an error or tolerance range is provided.

Where a positional relationship between two elements is described with such a term as "on," "above," "below," "next," or the like, one or more other elements may be located between the two elements unless the term is used with a more limiting term, such as "immediate(ly)" or "direct(ly)."

For example, where a first element is described as being positioned "on" a second element, the first element may be positioned above and contact the second element or may merely be above the second element with one or more additional elements disposed between the first and second elements.

Although terms "first," "second," and the like may be used herein to describe various elements, these elements should not be interpreted to be limited by these terms as they are not used to define a particular essence, order, sequence, precedence, or number of such elements. These terms are used only to refer to one element separately from another. For example, a first element could be termed a second element, and a second element could similarly be termed a first element, without departing from the scope of the present disclosure.

Like reference numerals generally denote like elements throughout the specification, unless otherwise specified.

A size and a thickness of each component illustrated in the drawing are illustrated for convenience of description, and the present disclosure is not limited to the size and the thickness of the component illustrated.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other or may be carried out together in association with each other.

Hereinafter, example embodiments of the present disclosure will be described in detail with reference to accompanying drawings.

FIG. 1 is a schematic diagram of a display device according to an example embodiment of the present disclosure. In FIG. 1, for the convenience of description, among various components of the display device 100, only a display panel PN, a gate driver GD, a data driver DD, and a timing controller TC are illustrated.

As shown in FIG. 1, the display device 100 may include a display panel PN including a plurality of sub pixels SP, a gate driver GD and a data driver DD for supplying various signals to the display panel PN, and a timing controller TC which can control the gate driver GD and the data driver DD.

The gate driver GD may supply a plurality of scan signals to a plurality of scan lines SL, respectively, according to a plurality of gate control signals supplied from the timing controller TC. Even though FIG. 1 illustrates one gate driver GD disposed to be spaced apart from one side of the display panel PN, the number of the gate drivers GD and the placement thereof are not limited thereto.

The data driver DD may supply a data voltage to a plurality of data lines DL according to a plurality of data control signals and image data supplied from the timing controller TC. The data driver DD may convert the image data into a data voltage using a reference gamma voltage and may supply the converted data voltage to the plurality of data lines DL.

The timing controller TC may align image data input from an external source to supply the image data to the data driver DD. The timing controller TC may generate a gate control signal and a data control signal using synchronization signals, such as a dot clock signal, a data enable signal, and horizontal/vertical synchronization signals, input from the external source. The timing controller TC may supply the generated gate control signal and data control signal to the gate driver GD and the data driver DD, respectively, to control the gate driver GD and the data driver DD.

The display panel PN is configured to display images to the user and may include a plurality of sub pixels SP. In the display panel PN, a plurality of scan lines SL and a plurality of data lines DL may intersect each other, and the plurality of sub pixels SP may be formed at intersections of the scan lines SL and the data lines DL.

In the display panel PN, an active area AA and a non-active area NA may be defined.

The active area AA is an area configured to display images in the display device 100. In the active area AA, a plurality of sub pixels SP configuring a plurality of pixels and a pixel circuit for driving the plurality of sub pixels SP may be disposed. A sub pixel SP is a minimum unit which configures the active area AA, and n sub pixels SP may form one pixel, n being a natural number. In each of the plurality of sub pixels SP, a thin film transistor for driving a corresponding light emitting diode 120 (see FIG. 2) may be disposed. The plurality of light emitting diodes 120 may be defined in different ways depending on the type of the display panel PN. For example, where the display panel PN is an inorganic light emitting display panel PN, the light emitting diode 120 may be a light emitting diode (LED) or a micro light emitting diode (micro LED).

In the active area AA, a plurality of signal lines for transmitting various signals to the plurality of sub pixels SP may be disposed. For example, the plurality of signal lines may include a plurality of data lines DL for supplying a data voltage to each of the plurality of sub pixels SP and a plurality of scan lines SL for supplying a scan signal to each of the plurality of sub pixels SP. The plurality of scan lines SL may extend in one direction in the active area AA to be connected respectively to the plurality of sub pixels SP, and the plurality of data lines DL may extend in a different direction in the active area AA to be connected respectively to the plurality of sub pixels SP. In addition, in the active area AA, a low-potential power line and a high-potential power line may be further disposed, but the present disclosure is not limited thereto.

The non-active area NA is an area where images are not displayed so that the non-active area NA may be defined as an area extending from (or outside) the active area AA. In the non-active area NA, a link line for transmitting a signal to the sub pixel SP of the active area AA, a pad electrode, a driving IC, such as a gate driver IC or a data driver IC, or the like, may be disposed.

Here, the non-active area NA is not limited to an example illustrated in the drawings. For example, the non-active area NA may be located on a rear surface of the display panel PN, that is, a surface opposite to the surface on which the sub pixels SP are not disposed or the non-active are NA may be omitted.

In addition, a driver, such as a gate driver GD, a data driver DD, and a timing controller TC, may be connected to the display panel PN in various ways. For example, the gate driver GD may be mounted in the non-active area NA in a gate in panel (GIP) manner or mounted between the plurality of sub pixels SP in the active area AA in a gate in active area (GIA) manner.

For example, the data driver DD and the timing controller TC may be formed on separate flexible films and printed circuit boards or on the same printed circuit board. The display panel PN may be electrically connected to the data driver DD and the timing controller TC by bonding the flexible film(s) and the printed circuit board(s) to the pad electrode formed in the non-active area NA of the display panel PN.

As another example, where the gate driver GD is mounted in the active area AA in the GIA manner and a side line connecting the signal line on the front surface of the display panel PN to the pad electrode on a rear surface of the display panel PN is formed to bond the flexible film and the printed circuit board onto a rear surface of the display panel PN, the non-active area NA may be minimized on the front surface of the display panel PN. Therefore, in an example where the gate driver GD, the data driver DD, and the timing controller TC are connected to the display panel PN as described above, a zero bezel with substantially no bezel may be implemented.

Figure 2:
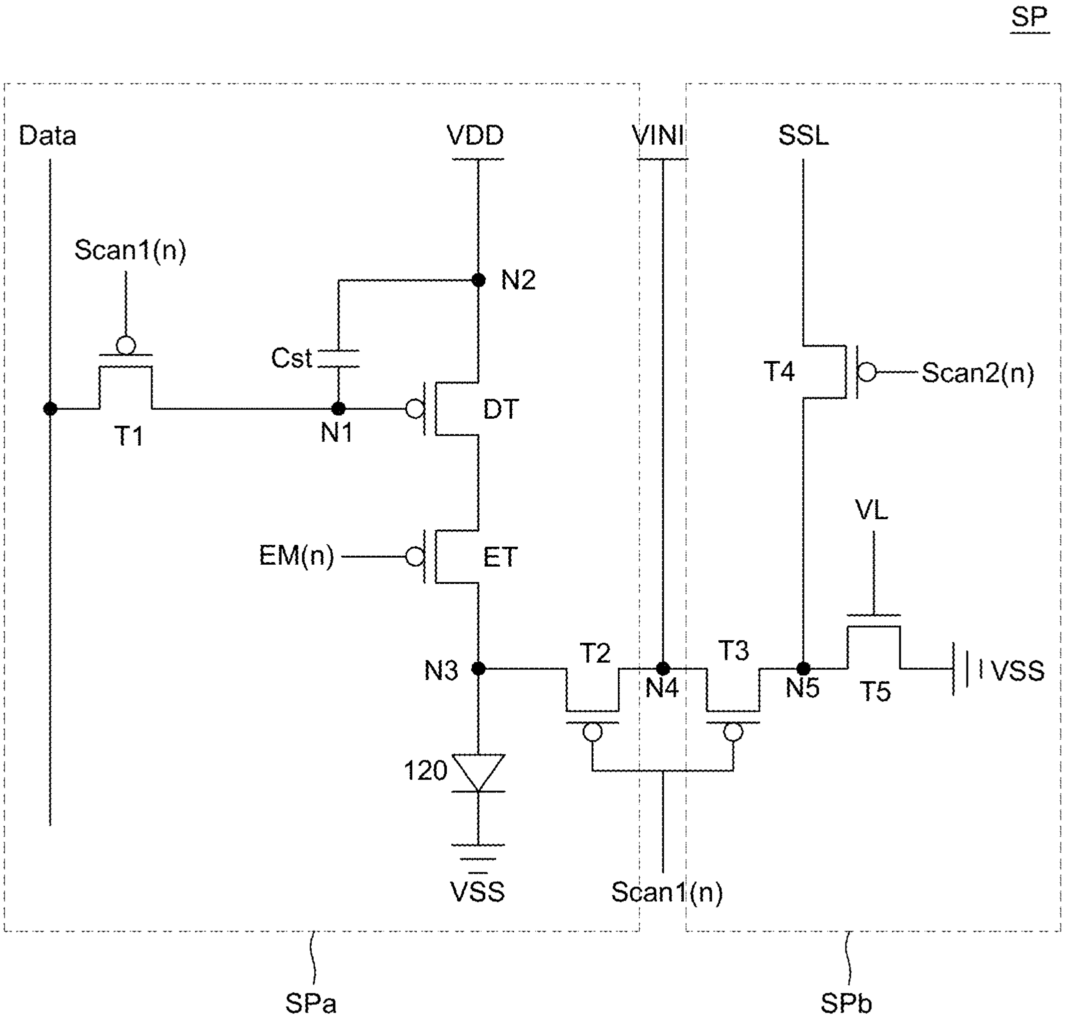
FIG. 2 is a circuit diagram of a sub pixel of a display device according to an example embodiment of the present disclosure.
Figure 3:
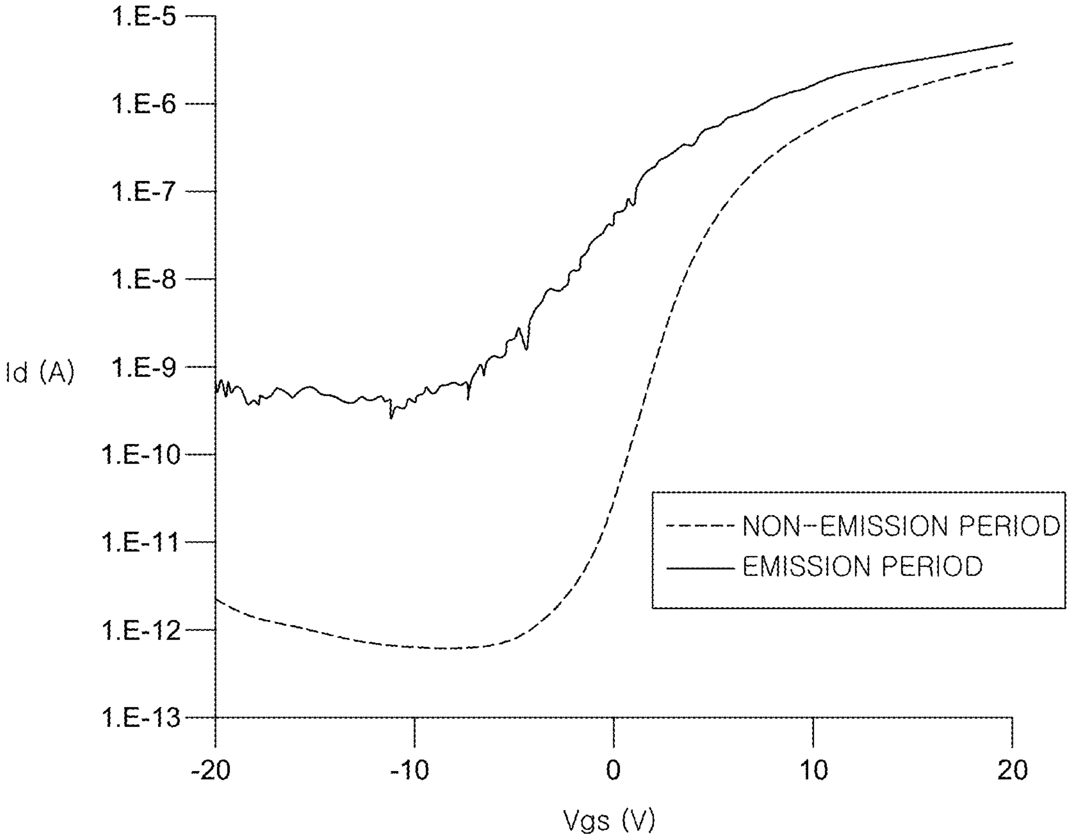
FIG. 3 is an example graph of a drain current Id according to a gate-source voltage Vgs of a fifth transistor in a display device according to an example embodiment of the present disclosure.

FIG. 2 is an example circuit diagram of a sub pixel of a display device according to an example embodiment of the present disclosure. FIG. 3 is an example graph of a drain current Id according to a gate-source voltage Vgs of a fifth transistor T5 in the FIG. 2 example circuit. Specifically, FIG. 3 is an example graph for explaining an off-current of a fifth transistor T5 according to external light.

First, the sub pixel SP of the display device 100 according to the example embodiment of the present disclosure may include a fifth transistor T5 which serves as a photo sensing transistor to sense the intensity of light emitted from the light emitting diode 120. The luminance deviation between the plurality of sub pixels SP may be compensated based on the light sensing result.

As illustrated in FIG. 2, each of the plurality of sub pixels SP may include a light emitting diode 120, a light emitting unit (or circuit) SPa, and a sensing unit (or circuit) SPb. The light emitting unit SPa is a configuration to supply a driving current to the light emitting diode 120 to allow the light emitting diode 120 to emit light, and the sensing unit SPb is a configuration to sense light emitted from the light emitting diode 120 in real time to detect a luminance. The light emitting unit SPa and the sensing unit SPb may include a plurality of transistors and capacitors Cst to drive the light emitting diode 120 and to sense the luminance of light.

The plurality of transistors may be formed by different types of transistors. For example, one transistor among the plurality of transistors may be a transistor having an oxide semiconductor as an active layer. The oxide semiconductor material has a low off-current so that the oxide semiconductor material is appropriate for a switching transistor which maintains a short turn-on time and a long turn-off time. As another example, another transistor among the plurality of transistors may be a transistor having a low temperature poly-silicon (LTPS) as an active layer. The poly-silicon material has a high mobility to have a low power consumption and excellent reliability so that it is appropriate for the driving transistor DT. Further, as another example, yet another transistor, among the plurality of transistors, may be a transistor having an amorphous silicon (a-Si) as an active layer. The amorphous silicon has a characteristic in that the off-current is generated by the external light so it may be used for the photo sensing transistor.

The plurality of transistors may be N-type transistors or P-type transistors. In the N-type transistor, carriers are electrons so that electrons may flow from the source electrode to the drain electrode and currents may flow from the drain electrode to the source electrode. In the P-type transistor, carriers are holes so that holes may flow from the source electrode to the drain electrode and currents may flow from the source electrode to the drain electrode. For example, one or more of the plurality of transistors may be an N-type transistor(s), and the remainder of the plurality of transistors may be a P-type transistor(s).

Hereinafter, the description of example embodiments will be made with the fifth transistor T5, among the plurality of transistors, being an N-type transistor including amorphous silicon and the remaining transistor(s) excluding the fifth transistor T5 being P-type transistors including poly-silicon. However, each of the remaining transistors excluding the plurality of transistors may be an N-type transistor including poly-silicon or an N-type transistor including an oxide semiconductor, but is not limited thereto.

As shown in FIG. 2, the light emitting unit (or circuit) SPa may include a first transistor T1, a second transistor T2, a driving transistor DT, and an emission control transistor ET.

The driving transistor DT may be a transistor configured to control a driving current based on a data voltage Data transmitted from the first transistor T1. The driving transistor DT may have a gate electrode connected to a second node N2, a source electrode connected to a high-potential power line VDD, and a drain electrode connected to an emission control transistor ET.

The first transistor T1 may be a transistor configured to be turned on by a first scan signal Scan1(*n*) to transmit a data voltage Data to the driving transistor DT. The first transistor T1 may have a gate electrode connected to a first scan line, a source electrode connected to a data line DL, and a drain electrode connected to the gate electrode of the driving transistor DT (which is connected to the second node N2). The first transistor T1 may be turned on by the first scan signal Scan1(*n*) from the first scan line to transmit the data voltage Data of the data line DL to the gate electrode of the driving transistor DT.

The second transistor T2 may be a transistor configured to initialize an anode voltage of the light emitting diode 120. The second transistor T2 may have a gate electrode connected to the first scan line, a source electrode connected to an initialization line (which is connected to a fourth node N4), and a drain electrode connected to an anode of the light emitting diode 120 (which is connected to the third node N3). The second transistor T2 may be turned on by a first scan signal SCAN1(*n*) from the first scan line to supply the initialization voltage VINI to the anode of the light emitting diode 120.

The emission control transistor ET may be a transistor for controlling an emission period of the light emitting diode 120. The emission control transistor ET may have a gate electrode connected to the emission control line, a source electrode connected to the drain electrode of the driving transistor DT, and a drain electrode connected to the anode of the light emitting diode 120 (which is connected to the third node N3). The emission control transistor ET may be turned on by the emission control signal EM(n) of the emission control line to transmit a driving current from the driving transistor DT to the light emitting diode 120.

The capacitor Cst may maintain a potential difference between the gate electrode and the source electrode of the driving transistor DT while the light emitting diode 120 emits light to allow a constant driving current to flow. The capacitor Cst may include a plurality of capacitor Cst electrodes. One or more capacitor Cst electrodes may be connected to the first node N1, and the remaining capacitor Cst electrode(s) may be connected to the second node N2.

Next, the sensing unit (or circuit) SPb may include a third transistor T3, a fourth transistor T4, and a fifth transistor T5.

The third transistor T3 may be a transistor configured to initialize a voltage of the fifth node N5. The third transistor T3 may have a gate electrode connected to the first scan line, a source electrode connected to the initialization line (which is connected to the fourth node N4), and a drain electrode connected to the fifth node N5. The third transistor T3 may be turned on by the first scan signal SCAN1(*n*) to transmit the initialization voltage VINI of the initialization line to the fifth node N5. The gate electrodes of the third transistor T3 and the second transistor T2 may be connected to the same first scan line to be simultaneously turned on or turned off and to transmit the initialization voltage VINI to the light emitting unit SPa and the sensing unit SPb, respectively.

The fourth transistor T4 may be a transistor configured to sense a voltage of the fifth node N5. The fifth node N5 may be (or may be connected to) a drain electrode of the fifth transistor T5, which may be a photo sensing transistor and may sense the voltage at the fifth node N5 to detect the off-current flowing through the fifth transistor T5. The fourth transistor T4 may have a gate electrode connected to a second scan line, a source electrode connected to the fifth node N5, and a drain electrode connected to the sensing line SSL. The fourth transistor T4 may be turned on by the second scan signal Scan2(*n*) of the second scan line to connect the fifth node N5 and the sensing line SSL. Even though it is not illustrated in the drawing, the data driver DD including an analog to digital converter may be connected to the sensing line SSL, and the analog to digital converter of the data driver DD may detect the voltage at the fifth node N5 through the sensing line SSL.

The fifth transistor T5 may be a photo sensing transistor configured to sense light emitted from the light emitting diode 120. The fifth transistor T5 may have a gate electrode connected to the first voltage line VL, a drain electrode connected to the fifth node N5, and a source electrode connected to a low-potential power line VSS.

Here, the first voltage line VL may be a wiring line to which a turn-off level of voltage is continuously applied to turn off the fifth transistor T5. Accordingly, the fifth transistor T5 having the gate electrode connected to the first voltage line VL to be applied with a turn-off level of voltage, for example, a low-level voltage, may always be in a turned-off state.

The fifth transistor T5 may be a transistor having an active layer of amorphous silicon and may be affected by the external light so that the intensity of the off-current may vary. That is, in the turned-off state, no current should flow through the fifth transistor T5. However, the active layer of the fifth transistor T5 may react to the external light so that a leakage current may flow. Then, the off-current may vary depending on the luminance, the intensity, or a wavelength of the external light.

As shown in FIG. 3, when the gate-source voltage Vgs (which is a voltage difference between the gate electrode and the source electrode) of the fifth transistor T5 is equal to or higher than a threshold voltage, the fifth transistor T5 may be turned on so that the drain current Id may start flowing. For example, it has been confirmed that, in a section of approximately 0 V or higher, the drain current Id linearly increases. When the gate-source voltage Vgs is equal to or lower than the threshold voltage, the fifth transistor T5 may be turned off so that the drain current Id does not flow. For example, in a section of approximately 0 V or lower, the fifth transistor T5 may be turned off so that the drain current Id does not substantially flow.

However, an off-current may flow through the fifth transistor T5 in the off-state due to the external light. Further, the off-current of the fifth transistor T5 may vary depending on the intensity of the external light. For example, in the non-emission period when the light emitting diode 120 does not emit light, the drain current Id of the turned-off fifth transistor T5 may be approximately 1E-12 A. In the emission period when the light emitting diode 120 emits light, the drain current Id of the turned-off fifth transistor T5 may be approximately 1E-9 A. Accordingly, when the external light is incident to the turned-off fifth transistor T5, the off-current of the fifth transistor T5 may increase, and the luminance of the light from the light emitting diode 120 may be sensed based on the off-current change.

In addition, the off-current may vary depending on the luminance, the intensity, or the wavelength of the external light. Accordingly, the off-current of the fifth transistor T5 may vary depending on whether the light emitting diode 120 disposed in the same sub pixel SP emits light. For example, when the light emitting diode 120 does not emit light, the off-current of the fifth transistor T5 may be relatively low, and when the light emitting diode 120 emits light, the off-current of the fifth transistor T5 may be relatively high. Accordingly, the higher the luminance of light emitted from the light emitting diode 120, the higher the off-current of the fifth transistor T5, and the lower the luminance of light, the lower the off-current of the fifth transistor T5.

Accordingly, when the light emitting diode 120 emits light, the off-current may flow from the drain electrode to the source electrode of the fifth transistor T5 to change the voltage of the fifth node N5. Therefore, when the light emitting diode 120 emits light, the voltage change of the fifth node N5 due to the off-current of the fifth transistor T5 may be measured to sense the luminance of light emitted from the light emitting diode 120.

Hereinafter, a driving process of the sub pixel SP of the display device 100 according to an example embodiment of the present disclosure will be described in more detail with reference to FIGS. 4 to 5C.

Figure 4:
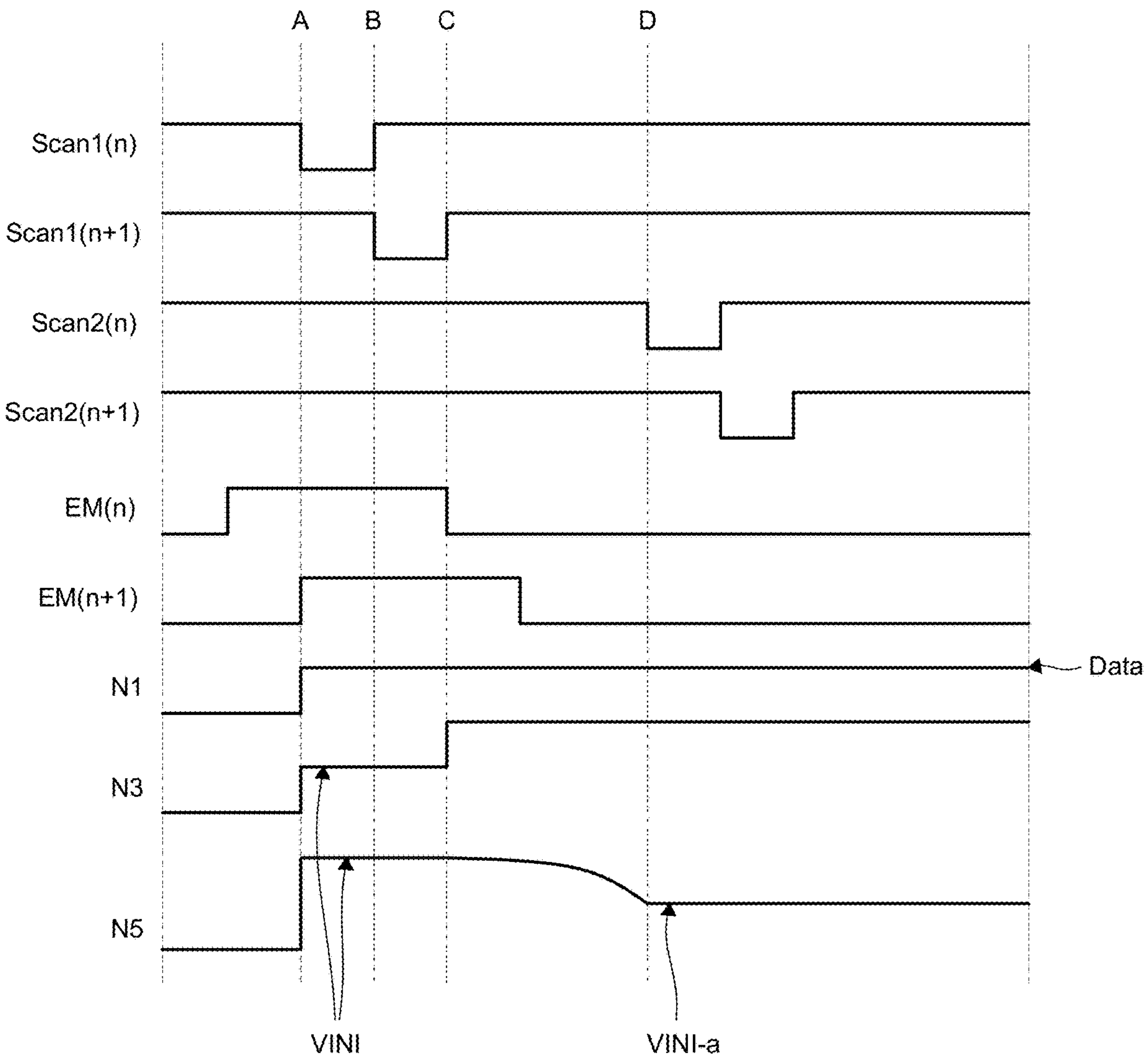
FIG. 4 is a timing diagram of a sub pixel of a display device according to an example embodiment of the present disclosure.
Figure 5A:
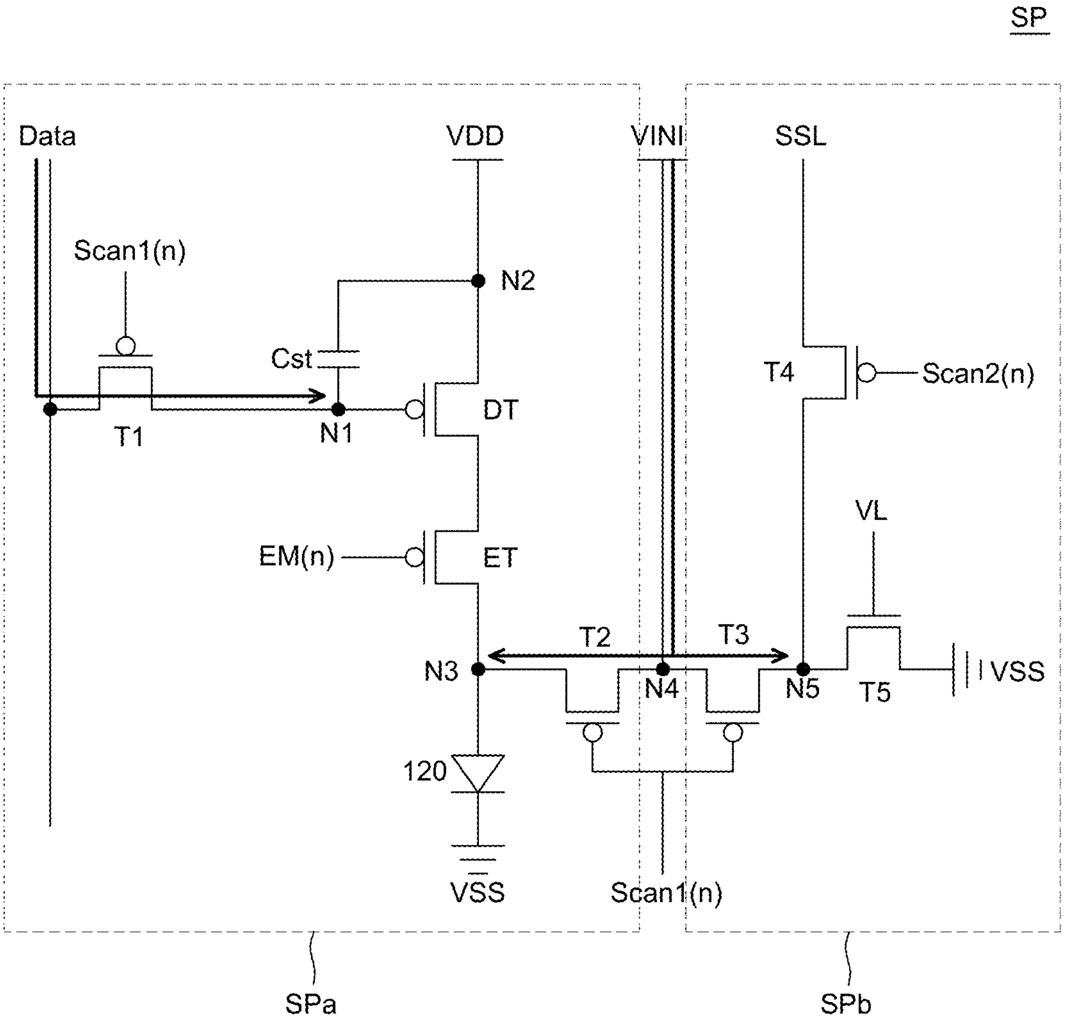
FIG. 5A is a circuit diagram of a sub pixel of a display device according to an example embodiment of the present disclosure in an initialization and data writing period.
Figure 5B:
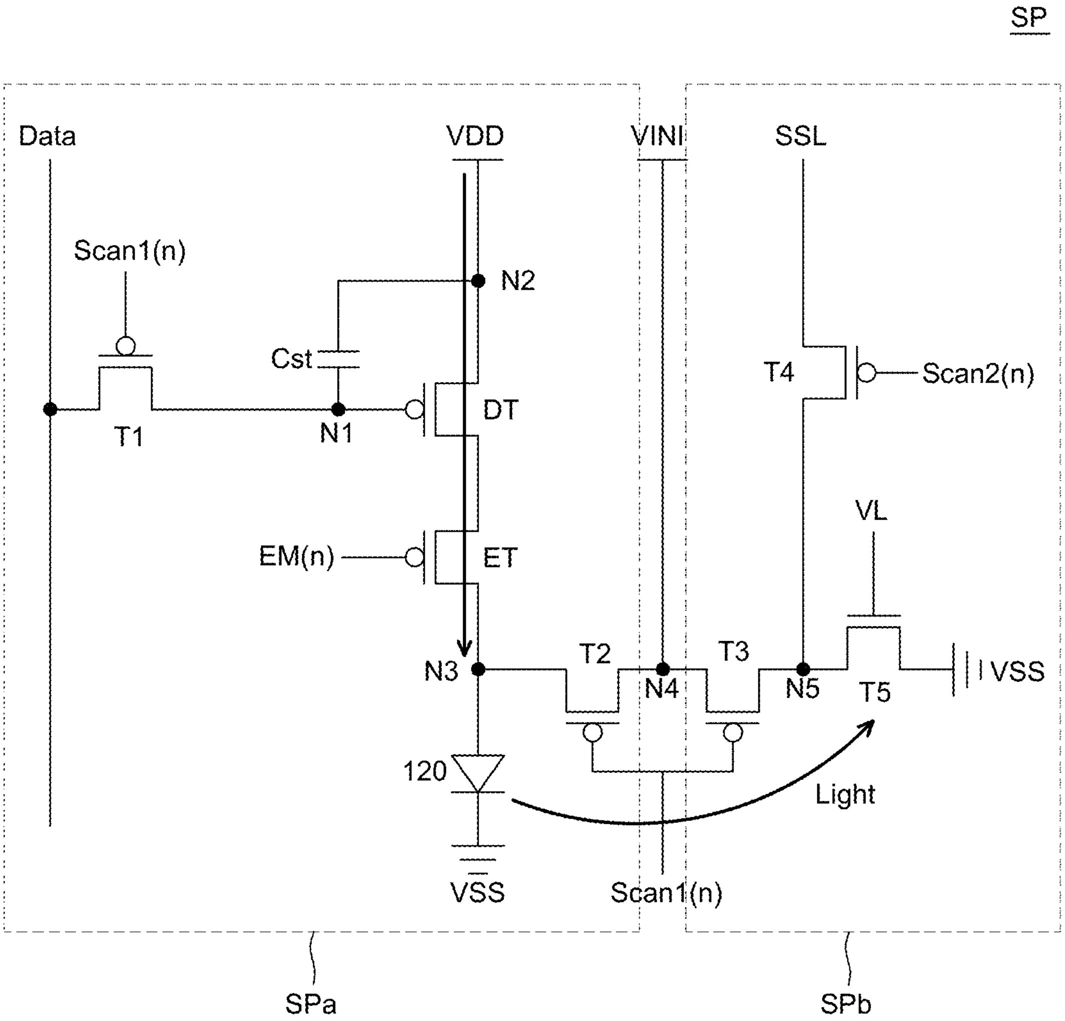
FIG. 5B is a circuit diagram of a sub pixel of a display device according to an example embodiment of the present disclosure in an emission period.

FIG. 4 is a timing diagram of a sub pixel of a display device according to an example embodiment of the present disclosure. FIG. 5A is a circuit diagram of a sub pixel of a display device according to an example embodiment of the present disclosure in an initialization and data writing period. FIG. 5B is a circuit diagram of a sub pixel of a display device according to an example embodiment of the present disclosure in an emission period. FIG. 5C is a circuit diagram of a sub pixel of a display device according to an example embodiment of the present disclosure in a sensing period.

As illustrated in FIG. 4, the sub pixel SP of the display device 100 according to the example embodiment of the present disclosure may be driven in the order of the initialization and data writing period, the emission period, and the sensing period. In the FIG. 4 example, a period from time A to time B is the initialization and data writing period, a period after time C is the emission period, and a period after time D is the sensing period. A part of the emission period may overlap the sensing period. That is, the sensing period may be performed simultaneously with the emission period.

As shown in FIGS. 4 and 5A, in the initialization and data writing period between the time A and the time B, a low level of first scan signal Scan1(*n*) is output to the first scan line. Accordingly, the first transistor T1, the second transistor T2, and the third transistor T3 may be turned on.

The turned-on first transistor T1 may transmit the data voltage Data of the data line DL to the first node N1. The data voltage Data may be transmitted to the gate electrode of the driving transistor DT, and a voltage reflecting the data voltage Data may be charged in the capacitor Cst. Therefore, the data voltage Data may be written in the light emitting unit SPa of the sub pixel SP. Thereafter, a voltage stored in the capacitor Cst may maintain the voltage at the gate electrode of the driving transistor DT constant during the emission period to supply a constant driving current to the light emitting diode 120.

The initialization voltage VINI may be transmitted to the third node N3 through the turned-on second transistor T2, and the initialization voltage VINI may be transmitted to the fifth node N5 through the turned-on third transistor T3. Accordingly, the voltage of the anode of the light emitting diode 120 of the light emitting unit SPa may be initialized to the initialization voltage VINI, and the voltage of the fifth node N5 of the sensing unit SPb may be initialized to the initialization voltage VINI.

Next, as shown in FIGS. 4 and 5B, in the emission period after the time C, a low level of the emission control signal EM (n) may be output to the emission control line. Accordingly, the emission control transistor ET may be turned on.

The driving current from the driving transistor DT may be supplied to the light emitting diode 120 through the turned-on emission control transistor ET. Accordingly, the light emitting diode 120 may be supplied with the driving current to emit light during the period when the emission control transistor ET is turned on.

In addition, from the time C when the light emitting diode 120 starts emitting light, the off-current of the fifth transistor T5 may increase by the light emitted from the light emitting diode 120. The off-current may flow from the drain electrode to the source electrode of the fifth transistor T5, and the voltage at the drain electrode of the fifth transistor T5 may change. For example, in the initialization period between the time A and the time B, the voltage at the fifth node N5 (which is or is connected to the drain electrode of the fifth transistor T5) is initialized to the initialization voltage VINI. However, after the time C when the light emitting diode 120 emits light, the off-current may flow through the fifth transistor T5 so that the voltage t the fifth node N5 may decrease. The voltage at the fifth node N5 may continuously decrease and then may converge to a specific voltage after a predetermined period. For example, the voltage at the fifth node N5 may converge to a value VINI-a obtained by subtracting a voltage change amount “a” from the initialization voltage VINI. The voltage change amount “a” at the fifth node N5 may be proportional to the intensity of the light emitted from the light emitting diode 120. The larger the voltage change amount “a”, the stronger the intensity of emitted light, and the smaller the voltage change amount “a”, the weaker the intensity of the emitted light.

Figure 5C:
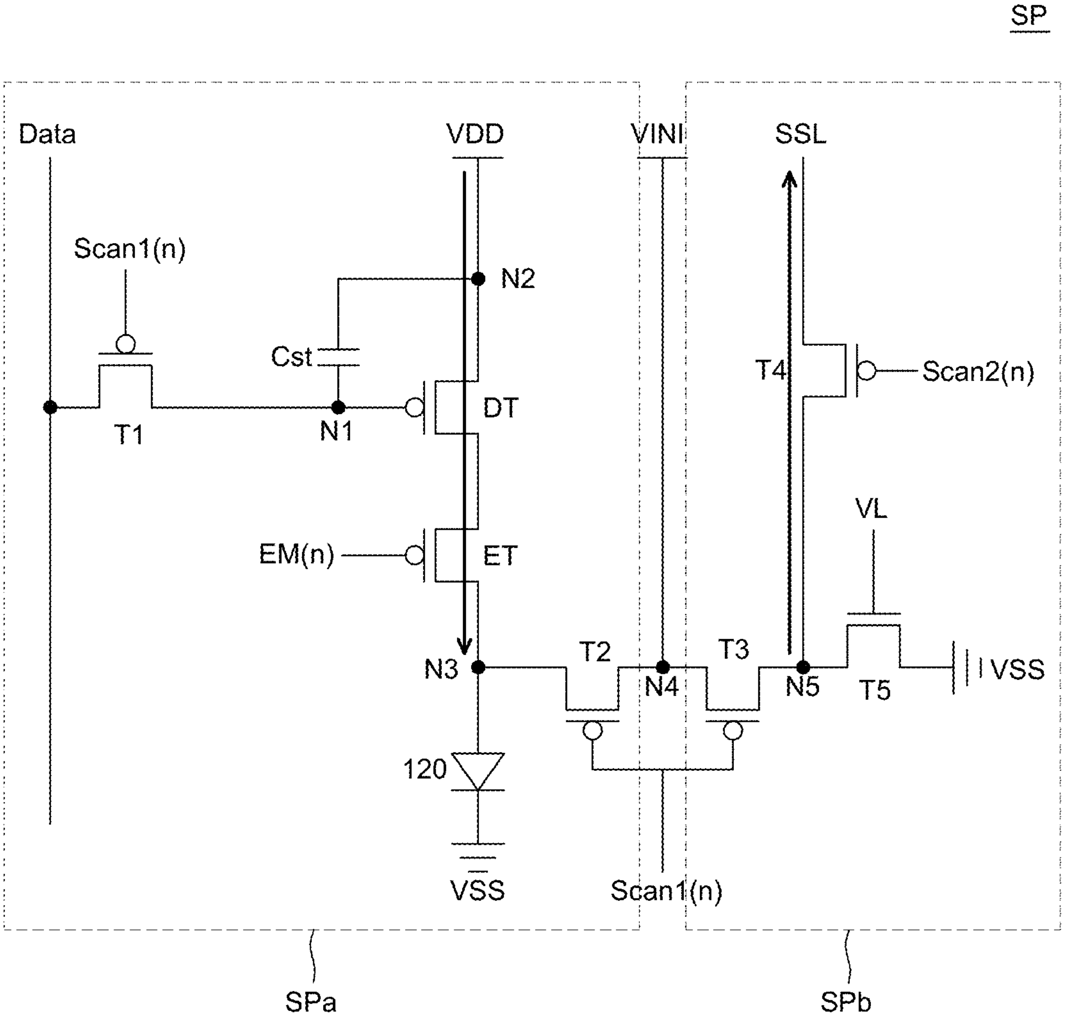
FIG. 5C is a circuit diagram of a sub pixel of a display device according to an example embodiment of the present disclosure in a sensing period.

Next, as shown in FIGS. 4 and 5C together, a low level of second scan signal Scan2(*n*) is output to the second scan line from the time D which is a sensing period in the middle of the emitting period when the light emitting diode 120 emits light. Accordingly, the fourth transistor T4 of the sensing unit SPb may be turned on.

The turned-on fourth transistor T4 may connect the fifth node N5 and the sensing line SSL. Therefore, the data driver DD may detect the voltage change at the fifth node N5 through the turned-on fourth transistor T4 and the sensing line SSL and may detect the luminance of the light emitting diode 120 based on the voltage change. Accordingly, the data driver DD may detect the luminance deviation of each of the plurality of sub pixels SP and may adjust the data voltage Data applied to the sub pixel SP in a subsequent frame to compensate for the luminance deviation.

In another aspect, where a micro LED is used as the light emitting diode 120, a reflective layer RE (see, e.g., FIG. 6) may be formed below the light emitting diode 120 to output light emitted from the light emitting diode 120 to the outside of the display device 100. However, if the reflective layer RE is formed between the light emitting diode 120 and the fifth transistor T5, light emitted from the light emitting diode 120 cannot be incident to the fifth transistor T5 so that it may be difficult to sense the light. Accordingly, in the display device 100 according to an example embodiment of the present disclosure, an opening REO (see, e.g., FIG. 6) corresponding to the fifth transistor T5 may be formed in the reflective layer RE disposed below the light emitting diode 120 to sense the luminance.

Hereinafter, an example placement structure of a light emitting diode 120 and a fifth transistor T5 for sensing light emitted from the light emitting diode 120 will be described with reference to FIG. 6.

Figure 6:
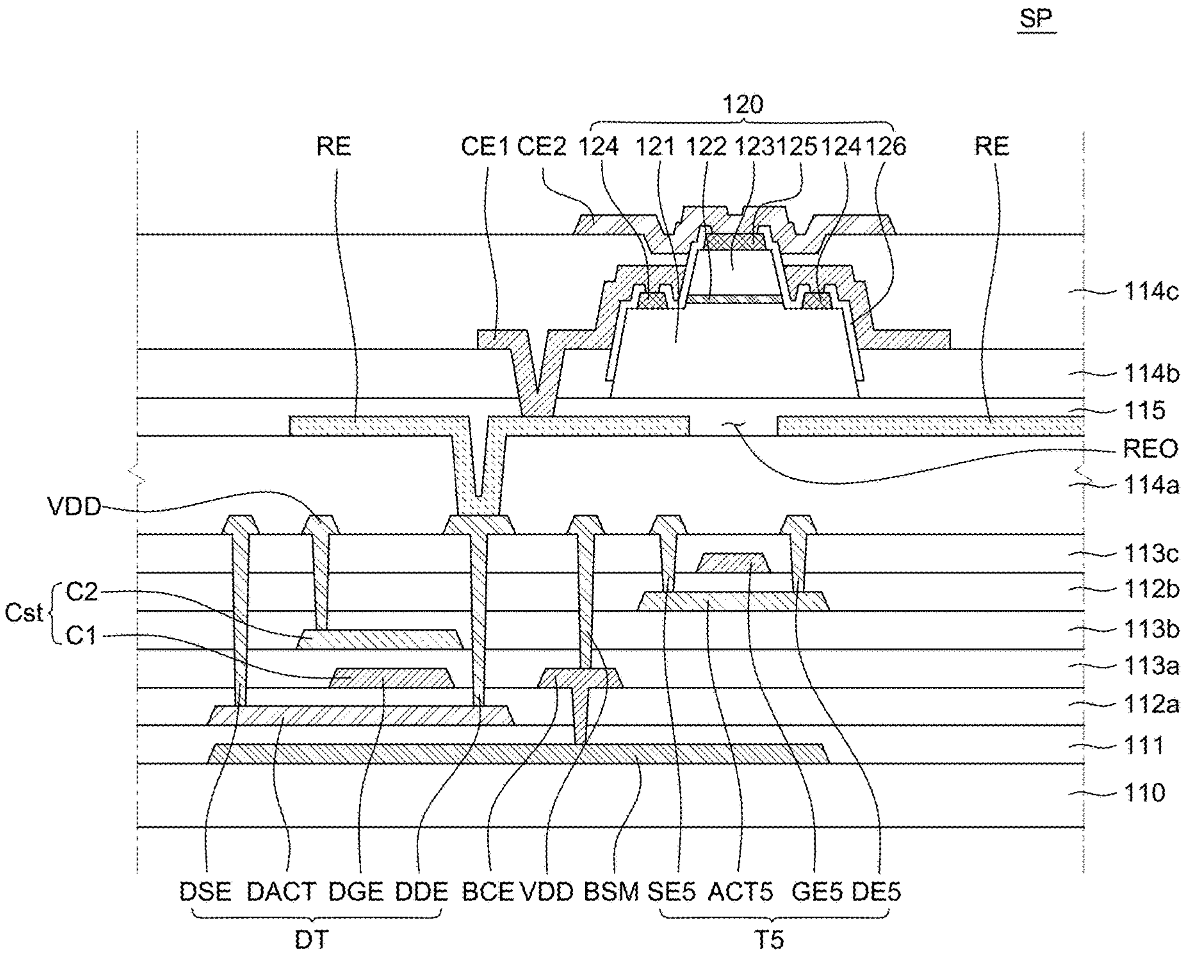
FIG. 6 is a cross-sectional view of a sub pixel of a display device according to an example embodiment of the present disclosure.

FIG. 6 is a cross-sectional view of a sub pixel of a display device according to an example embodiment of the present disclosure. In FIG. 6, for the convenience of description, among configurations of the plurality of sub pixels SP, only a driving transistor DT, a fifth transistor T5, a capacitor Cst, and a light emitting diode 120 are illustrated.

As shown in FIG. 6, a display panel PN of the display device 100 according to an example embodiment of the present disclosure may include a substrate 110, a buffer layer 111, a first gate insulating layer 112*a*, a first interlayer insulating layer 113*a*, a second interlayer insulating layer 113*b*, a second gate insulating layer 112*b*, a third interlayer insulating layer 113*c*, a first planarization layer 114*a*, an adhesive layer 115, a second planarization layer 114*b*, a third planarization layer 114*c*, a light shielding layer BSM, an auxiliary electrode BCE, a driving transistor DT, a fifth transistor T5, a capacitor Cst, a high-potential power line VDD, a reflective layer RE, a first connection electrode CE1, and a second connection electrode CE2.

The substrate 110 is a component for supporting various components included in the display device 100 and may be formed of an insulating material. For example, the substrate 110 may be formed of glass or resin. Further, the substrate 110 may be configured to include polymer or plastics or may be formed of a material having flexibility.

The light shielding layer BSM may be disposed in each of the plurality of sub pixels SP on the substrate 110. The light shielding layer BSM may be disposed so as to overlap the driving transistor DT and the fifth transistor T5. The light shielding layer BSM may block light from being incident on a driving active layer DACT of the driving transistor DT and a fifth active layer ACT5 of the fifth transistor T5 from a lower portion of the substrate 110. Light directed toward the driving active layer DACT of the driving transistor DT may be blocked by the light shielding layer BSM to minimize a leakage current. Further, external light directed toward the fifth transistor T5 may be blocked by the light shielding layer BSM to minimize the change of the off-current by external light other than light emitted from the light emitting diode 120. Accordingly, the light shielding layer BSM may be disposed to block light from being incident on the fifth transistor T5 from the lower portion of the substrate 110 to improve the luminance sensing accuracy of the light emitting diode 120.

The light shielding layer BSM may be formed of an opaque metal material and, for example, may be formed of a single layer or a double layer structure formed of any one or an alloy of opaque metals, such as aluminum (Al), chrome (Cr), tungsten (W), titanium (Ti), nickel (Ni), neodymium (Nd), molybdenum (Mo), and copper (Cu).

The buffer layer 111 may be disposed on the substrate 110 and the light shielding layer BSM. The buffer layer 111 may reduce permeation of moisture or impurities through the substrate 110. The buffer layer 111 may be configured by a single layer or a double layer of silicon oxide (SiOx) or silicon nitride (SiNx), but is not limited thereto. However, the buffer layer 111 may be omitted depending on a type of substrate 110 or a type of transistor employed, but is not limited thereto.

The driving transistor DT may be disposed in each of the plurality of sub pixels SP on the buffer layer 111. The driving transistor DT may include a driving active layer DACT, a driving gate electrode DGE, a driving source electrode DSE, and a driving drain electrode DDE.

First, the driving active layer DACT may be disposed on the buffer layer 111. The driving active layer DACT may be formed of any one of a semiconductor material, such as an oxide semiconductor, amorphous silicon, or poly-silicon. For example, the driving active layer DACT of the driving transistor DT may be formed of low temperature poly-silicon (LTPS), which has a high mobility, to have low power consumption and excellent reliability, but is not limited thereto.

The first gate insulating layer 112*a* may be disposed on the driving active layer DACT. The first gate insulating layer 112*a* is an insulating layer which insulates the driving active layer DACT from the driving gate electrode DGE and may be configured by a single layer or a double layer of silicon oxide (SiOx) or silicon nitride (SiNx), but is not limited thereto.

The driving gate electrode DGE may be disposed on the first gate insulating layer 112*a*. The driving gate electrode DGE may be configured by a conductive material, such as copper (Cu), aluminum (Al), molybdenum (Mo), nickel (Ni), titanium (Ti), chrome (Cr), or an alloy thereof, but is not limited thereto.

The first interlayer insulating layer 113*a*, the second interlayer insulating layer 113*b*, the second gate insulating layer 112*b*, and the third interlayer insulating layer 113*c* may be sequentially disposed on the driving gate electrode DGE.

First, the first interlayer insulating layer 113*a* may be disposed on the driving gate electrode DGE, the second interlayer insulating layer 113*b* may be disposed on the first interlayer insulating layer 113*a*, and the third interlayer insulating layer 113*c* may be disposed on the second interlayer insulating layer 113*b*. The first interlayer insulating layer 113*a*, the second interlayer insulating layer 113*b*, and the third interlayer insulating layer 113*c* are insulating layers for protecting a component therebelow. They may insulate some components of the display device 100 and may each be configured by a single layer or a double layer of silicon oxide (SiOx) or silicon nitride (SiNx), but are not limited thereto.

The second gate insulating layer 112*b* may be disposed between the second interlayer insulating layer 113*b* and the third interlayer insulating layer 113*c*. The second gate insulating layer 112*b* is an insulating layer which may insulate the fifth active layer ACT5 of the fifth transistor T5 from the fifth gate electrode GE5. The second gate insulating layer 112*b* may be configured by a single layer or a double layer of silicon oxide (SiOx) or silicon nitride (SiNx), but is not limited thereto.

The driving source electrode DSE and the driving drain electrode DDE of the driving transistor DT may be disposed on the third interlayer insulating layer 113*c*. The driving source electrode DSE and the driving drain electrode DDE may be electrically connected to the driving active layer DACT through respective contact holes formed in the third interlayer insulating layer 113*c*, the second gate insulating layer 112*b*, the second interlayer insulating layer 113*b*, and the first interlayer insulating layer 113*a*. The driving source electrode DSE may be electrically connected to the high-potential power line VDD, and the driving drain electrode DDE may be electrically connected to the light emitting diode 120 through the reflective layer RE. The driving source electrode DSE and the driving drain electrode DDE may be configured by a conductive material, such as copper (Cu), aluminum (Al), molybdenum (Mo), nickel (Ni), titanium (Ti), chrome (Cr), or an alloy thereof, but are not limited thereto.

Next, the fifth transistor T5 may be disposed on the second interlayer insulating layer 113*b*. The fifth transistor T5 may include a fifth active layer ACT5, a fifth gate electrode GE5, a fifth source electrode SE5, and a fifth drain electrode DE5. The fifth transistor T5 including the fifth active layer ACT5 may be disposed so as to overlap the opening REO of the reflective layer RE and the light emitting diode 120.

The fifth active layer ACT5 may be disposed on the second interlayer insulating layer 113*b*. To sense light emitted from the light emitting diode 120, the fifth active layer ACT5 may be formed with amorphous silicon.

The second gate insulating layer 112*b* may be disposed on the fifth active layer ACT5, and the fifth gate electrode GE5 may be disposed on the second gate insulating layer 112*b*. The fifth gate electrode GE5 may be configured by a conductive material, such as copper (Cu), aluminum (Al), molybdenum (Mo), nickel (Ni), titanium (Ti), chrome (Cr), or an alloy thereof, but is not limited thereto.

The third interlayer insulating layer 113*c* may be disposed on the fifth gate electrode GE5, and the fifth source electrode SE5 and the fifth drain electrode DE5 may be disposed on the third interlayer insulating layer 113*c*. The fifth source electrode SE5 and the fifth drain electrode DE5 may be electrically connected to the fifth active layer ACT5 through respective contact holes formed on the third interlayer insulating layer 113*c*. The fifth source electrode SE5 and the fifth drain electrode DE5 may be configured by a conductive material, such as copper (Cu), aluminum (Al), molybdenum (Mo), nickel (Ni), titanium (Ti), chrome (Cr), or an alloy thereof, but are not limited thereto.

Next, the capacitor Cst may be disposed on the first gate insulating layer 112*a*. The capacitor Cst may include a first capacitor electrode C1 and a second capacitor electrode C2.

First, the first capacitor electrode C1 may be disposed on the first gate insulating layer 112*a*. The first capacitor electrode C1 may be connected to (or may also serve as) the driving gate electrode DGE disposed on the same layer. The first capacitor electrode C1 may be configured by a conductive material, such as copper (Cu), aluminum (Al), molybdenum (Mo), nickel (Ni), titanium (Ti), chrome (Cr), or an alloy thereof, but is not limited thereto.

The second capacitor electrode C2 may be disposed on the first interlayer insulating layer 113*a*. The second capacitor electrode C2 may be disposed to overlap the first capacitor electrode C1 with the first interlayer insulating layer 113*a* therebetween. The second capacitor electrode C2 may be electrically connected to the high-potential power line VDD. The second capacitor electrode C2 may be configured by a conductive material, such as copper (Cu), aluminum (Al), molybdenum (Mo), nickel (Ni), titanium (Ti), chrome (Cr), or an alloy thereof, but is not limited thereto.

Next, the high-potential power line VDD may be disposed on the third interlayer insulating layer 113*c*. The high-potential power line VDD may be configured by a conductive material, such as copper (Cu), aluminum (Al), molybdenum (Mo), nickel (Ni), titanium (Ti), chrome (Cr), or an alloy thereof, but is not limited thereto.

The auxiliary electrode BCE may be disposed between the high-potential power line VDD and the light shielding layer BSM. The auxiliary electrode BCE may be disposed on the first gate insulating layer 112*a* between the light shielding layer BSM and the high-potential power line VDD. The auxiliary electrode BCE may electrically connect the high-potential power line VDD and the light shielding layer BSM. If the light shielding layer BAM is floated, a threshold voltage of the driving transistor DT may fluctuate to affect the driving of the display device 100. Therefore, the light shielding layer BSM may be suppressed from operating as a floating gate by electrically connecting the light shielding layer BSM to the high-potential power line VDD, to which a constant voltage may be applied through the auxiliary electrode BCE. Further, the fluctuation of the threshold voltage of the driving transistor DT potentially generated by the floated light shielding layer BSM may be minimized. The auxiliary electrode BCE may be configured by a conductive material, such as copper (Cu), aluminum (Al), molybdenum (Mo), nickel (Ni), titanium (Ti), chrome (Cr), or an alloy thereof, but is not limited thereto.

Next, the first planarization layer 114*a* may be disposed on the driving transistor DT, the fifth transistor T5, the capacitor Cst, and the high-potential power line VDD. The first planarization layer 114*a* may planarize an upper portion of the substrate 110 on which the driving transistor DT is disposed. The first planarization layer 114*a* may be configured by a single layer or a double layer, and may be, for example, configured by benzocyclobutene, photoresist, or an acrylic organic material, but is not limited thereto.

A plurality of reflective layers RE may be disposed on the first planarization layer 114*a*. The reflective layer RE may be configured to reflect light emitted from the light emitting diode 120 toward an upper portion of the substrate 110 and may be disposed so as to overlap the light emitting diode 120. The reflective layer RE may also be disposed so as to overlap a circuit configuration of the sub pixel SP, such as the fifth transistor T5.

The reflective layer RE may reflect the light emitted from the light emitting diode 120 and may also be used as an electrode for electrically connecting the light emitting diode 120 and the pixel configuration of the sub pixel SP. For example, the reflective layer RE may be used as an electrode which electrically connects the driving transistor DT and the light emitting diode 120. Therefore, the reflective layer RE may include various conductive layers in consideration of a light reflection efficiency and a resistance. For example, the reflective layer RE may use an opaque conductive layer, such as silver (Ag), aluminum (Al), molybdenum (Mo), titanium (Ti), or an alloy thereof, and/or a transparent conductive layer, such as indium tin oxide ITO, but the material of the reflective layer RE is not limited thereto.

The reflective layer RE may include an opening REO. The opening REO of the reflective layer RE may be disposed to overlap the fifth transistor T5. The opening REO of the reflective layer RE may be disposed to overlap at least a part of the light emitting diode 120. Some of light emitted from the light emitting diode 120 may be incident on the fifth transistor T5 through the opening REO of the reflective layer RE. Therefore, as the light of the light emitting diode 120 is incident on the fifth transistor T5 through the opening REO of the reflective layer RE, an off-current may flow through the fifth transistor T5, and an intensity of light of the light emitting diode 120 may be sensed.

The adhesive layer 115 may be disposed on the reflective layer RE. The adhesive layer 115 may be formed on the entire surface of the substrate 110 to fix the light emitting diode 120 disposed on the adhesive layer 115. The adhesive layer 115 may be formed of a photo curable adhesive material which is cured by light. For example, the adhesive layer 115 may be formed of an acrylic material including a photoresist, but is not limited thereto.

The light emitting diode 120 may be disposed on the adhesive layer 115 in each of the plurality of sub pixels SP. The light emitting diode 120 is an element configured to emit light by a current and may include, for example, any of a red light emitting diode 120 configured to emit red light, a green light emitting diode 120 configured to emit green light, and a blue light emitting diode 120 configured to emit blue light, and may implement light with various colors including white by a combination thereof.

The light emitting diode 120 may include a first semiconductor layer 121, an emission layer 122, a second semiconductor layer 123, a first electrode 124, a second electrode 125, and an encapsulation layer 126.

The first semiconductor layer 121 may be disposed on the adhesive layer 115, and the second semiconductor layer 123 may be disposed on the first semiconductor layer 121. The first semiconductor layer 121 and the second semiconductor layer 123 may be layers formed respectively by doping n-type and p-type impurities into a specific material. For example, the first semiconductor layer 121 and the second semiconductor layer 123 may be layers doped respectively with n-type and p-type impurities into a material such as gallium nitride (GaN), indium aluminum phosphide (InAlP), or gallium arsenide (GaAs). The p-type impurity may be magnesium (Mg), zinc (Zn), beryllium (Be), and the like, and the n-type impurity may be silicon (Si), germanium, tin (Sn), and the like, but the present disclosure is not limited thereto.

The emission layer 122 may be disposed between the first semiconductor layer 121 and the second semiconductor layer 123. The emission layer 122 may be supplied with holes and electrons respectively from the first semiconductor layer 121 and the second semiconductor layer 123 to emit light. The emission layer 122 may be formed by a single layer or a multi-quantum well (MQW) structure, and for example, may be formed of indium gallium nitride (InGaN), gallium nitride (GaN), or the like, but is not limited thereto.

The first electrode 124 may be disposed on the first semiconductor layer 121. The first electrode 124 is an electrode configured to electrically connect the driving transistor DT and the first semiconductor layer 121. In this case, the first semiconductor layer 121 may be a semiconductor layer doped with a p-type impurity, and the first electrode 124 may be an anode. The first electrode 124 may be disposed on a top surface of the first semiconductor layer 121 which is exposed from the emission layer 122 and the second semiconductor layer 123. The first electrode 124 may be configured by a conductive material, for example, a transparent conductive material, such as indium tin oxide (ITO) or indium zinc oxide (IZO), or an opaque conductive material, such as titanium (Ti), gold (Au), silver (Ag), copper (Cu) or an alloy thereof, but is not limited thereto.

The second electrode 125 may be disposed on the second semiconductor layer 123. The second electrode 125 may be disposed on the top surface of the second semiconductor layer 123. The second electrode 125 may be an electrode configured to electrically connect the low-potential power line VSS and the second semiconductor layer 123. In this case, the second semiconductor layer 123 may be a semiconductor layer doped with an n-type impurity, and the second electrode 125 may be a cathode. The second electrode 125 may be configured by a conductive material, for example, a transparent conductive material, such as indium tin oxide (ITO) or indium zinc oxide (IZO), or an opaque conductive material, such as titanium (Ti), gold (Au), silver (Ag), copper (Cu) or an alloy thereof, but is not limited thereto.

On the other hand, the first semiconductor layer 121 may be a semiconductor layer doped with n-type impurities and the first electrode 124 may be a cathode, and the second semiconductor layer 123 may be a semiconductor layer doped with a p-type impurity and the second electrode 125 may be an anode, but the present disclosure is not limited thereto.

Next, the encapsulation layer 126 enclosing the first semiconductor layer 121, the emission layer 122, the second semiconductor layer 123, the first electrode 124, and the second electrode 125 may be disposed. The encapsulation layer 126 may be formed of an insulating material to protect the first semiconductor layer 121, the emission layer 122, and the second semiconductor layer 123. In the encapsulation layer 126, contact holes respectively exposing the first electrode 124 and the second electrode 125 may be formed to electrically connect a first connection electrode CE1 and a second connection electrode CE2 respectively to the first electrode 124 and the second electrode 125.

In addition, a part of the side surface of the first semiconductor layer 121 may be exposed from the encapsulation layer 126. The light emitting diode 120 manufactured on a wafer may be separated from the wafer to be transferred onto the display panel PN. However, during the process of separating the light emitting diode 120 from the wafer, a part of the encapsulation layer 126 may be torn. For example, a part of the encapsulation layer 126 adjacent to a lower edge of the first semiconductor layer 121 of the light emitting diode 120 may be torn during the process of separating the light emitting diode 120 from the wafer. Accordingly, a part of a lower side surface of the first semiconductor layer 121 may be exposed to the outside through the encapsulation layer 126. Even though the lower portion of the light emitting diode 120 is exposed from the encapsulation layer 126, the first connection electrode CE1 and the second connection electrode CE2 may be formed after forming the second planarization layer **114*b* and the third planarization layer 114*c* which cover the side surface of the first semiconductor layer 121**. Accordingly, a short defect may be reduced or prevented.

In the above description of an example embodiment of the present disclosure, the driving transistor DT is described as being electrically connected to the first semiconductor layer 121 and the first electrode 124 of the light emitting diode 120, and the low-potential power line VSS is described as being electrically connected to the second semiconductor layer 123 and the second electrode 125 of the light emitting diode 120. However, the present disclosure is not limited thereto. For example, the high-potential power line VDD or the low-potential power line VSS may be connected to the first semiconductor layer 121 and the first electrode 124 of the light emitting diode 120, and the driving transistor DT may be electrically connected to the second semiconductor layer 123 and the second electrode 125 of the light emitting diode 120, but the present disclosure is not limited thereto.

The second planarization layer **114*b* may be disposed on the adhesive layer 115 and the light emitting diode 120. The second planarization layer 114*b* may overlap a part of side surfaces of the plurality of light emitting diodes 120 to fix and protect the plurality of light emitting diodes 120. An open part of the encapsulation layer 126 which protects the side surface of the first semiconductor layer 121 of the light emitting diode 120 may be covered by the second planarization layer 114*b*. With this example configuration, potential contacts and short defects of the connection electrodes and the first semiconductor layer 121** may subsequently be suppressed (e.g., after the production or shipment of the display device).

The first connection electrode CE1 may be disposed on the second planarization layer 114*b*. The first connection electrode CE1 may be an electrode configured to electrically connect the first electrode 124 of the light emitting diode 120 and the driving transistor DT. The first connection electrode CE1 may be connected to the reflective layer RE through a contact hole formed in the second planarization layer 114*b* and the adhesive layer 115. Here, the reflective layer RE may also be connected to the driving drain electrode DDE of the driving transistor DT so that the driving drain electrode DDE of the driving transistor DT and the first electrode 124 of the light emitting diode 120 may be electrically connected to each other. The first connection electrode CE1 may be configured by a conductive material, for example, a transparent conductive material, such as indium tin oxide (ITO) or indium zinc oxide (IZO), or an opaque conductive material, such as titanium (Ti), gold (Au), silver (Ag), copper (Cu) or an alloy thereof, but is not limited thereto.

Next, the third planarization layer 114*c* may be disposed on the first connection electrode CE1 and the light emitting element 120. The third planarization layer 114*c* may be formed to cover an upper portion of the light emitting diode 120. A contact hole may be formed in the third planarization layer 114*c* to expose the second electrode 125 of the light emitting diode 120. The third planarization layer 114*c* may be disposed in an area between the first electrode 124 and the first connection electrode CE1 on one hand and the second electrode 125 on the other to reduce or prevent a potential short defect in a vertical direction. The third planarization layer 114*c* may be configured by a single layer or a double layer, and for example, configured by benzocyclobutene, photoresist, or an acrylic organic material, but is not limited thereto.

The second connection electrode CE2 may be disposed on the third planarization layer 114*c*. The second connection electrode CE2 may be an electrode configured to electrically connect the second electrode 125 of the light emitting diode 120 and the low-potential power line VSS. The second connection electrode CE2 may be electrically connected to the second electrode 125 of the light emitting diode 120 through a contact hole formed in the third planarization layer 114*c*. The second connection electrode CE2 may be formed of a transparent conductive material to allow light emitted from the light emitting diode 120 to travel to the outside of the display device 100. For example, the second connection electrode CE2 may be formed of a transparent conductive material, such as indium tin oxide (ITO) or indium zinc oxide (IZO), but is not limited thereto.

In addition, even though not illustrated in the drawing, a bank may be disposed in an area between the plurality of sub pixels SP on the third planarization layer 114*c* and the second connection electrode CE2. The bank may be disposed to be spaced apart from the light emitting diode 120 with a predetermined interval and may at least partially overlap the reflective layer RE. The bank may be formed of an opaque material to reduce color mixture between the plurality of sub pixels SP and, for example, may be formed of black resin, but is not limited thereto.

Further, a protection layer may be disposed on the bank, the third planarization layer 114*c*, and the second connection electrode CE2. The protection layer may be a layer for protecting configurations below the protection layer. The protection layer may be configured by a single layer or a double layer, and may, for example, be configured by benzocyclobutene, a light-transmitting epoxy, a photoresist, or an acrylic organic material, but is not limited thereto.

In the display device 100 according to an example embodiment of the present disclosure, the fifth transistor T5 may be disposed below the light emitting diode 120, and the opening REO may be formed in the reflective layer RE disposed between the light emitting diode 120 and the fifth transistor T5. Therefore, the fifth transistor T5 may sense light emitted from the light emitting diode 120. To increase a light emission efficiency of light emitted from the light emitting diode 120, the reflective layer RE may be formed below the light emitting diode 120. Here, the opening REO may be formed in the reflective layer RE to allow some of the light emitted from the light emitting diode 120 to be incident on the fifth transistor T5. The off-current of the fifth transistor T5 may change according to an amount of light incident on the fifth transistor T5 to change the voltage at the fifth node N5. This voltage change may be detected to sense the luminance of the sub pixel SP. Accordingly, the luminance of the sub pixel SP may be relatively simply sensed using the fifth transistor T5, and the luminance deviation between the plurality of sub pixels SP may be compensated for based on the luminance sensing result.

In the display device 100 according to an example embodiment of the present disclosure, the sensing unit (or circuit) SPb configured to sense light emitted from the light emitting diode 120 may be embedded in each sub pixel so that the structure and the driving process of the sub pixel SP may be simplified. The luminance of each of the plurality of sub pixels SP may be affected by various factors, such as deterioration or efficiency difference of the light emitting diode 120 and a threshold voltage deviation of the driving transistor DT among the sub pixels SP. In the display device 100 according to an example embodiment of the present disclosure, a deterioration level of the light emitting diode 120 or the threshold voltage deviation of the driving transistor DT is not necessarily sensed or compensated for separately. However, the sub pixel SP may directly sense light emitted from the light emitting diode 120 to compensate for the luminance deviation. That is, the finally emitted light may be compensated for using the sensing unit SPb so that it may have the effect of compensating for both the threshold voltage deviation of the driving transistor DT and the deterioration of the light emitting diode 120. Further, a separate period for internal compensation of the sub pixel SP is not necessary so that the driving process may be simplified. Accordingly, to compensate for the luminance deviation between the plurality of sub pixels SP, there is no need to use a complex internal compensation circuit, or the like, and a circuit configuration of the light emitting unit SPa of the sub pixel SP and a driving process of the sub pixel SP may be simplified.

Further, as in the display device 100 according to an example embodiment of the present disclosure, when the sensing unit SPb including the fifth transistor T5 directly senses the light to compensate for the luminance, it may have the same effect as the camera compensation. Specifically, before the shipment of the display device 100, it was possible to compensate for luminance deviations by directly sensing light using a camera, but after the shipment of the display device 100, such camera compensation was not possible. However, the sensing unit SPb configured to directly sense the light is included in the sub pixel SP so that, after the shipment of the display device 100, the luminance deviation can be compensated for and the luminance may be compensated as efficiently as the camera compensation. Further, the luminance deviation between the sub pixels SP may be sensed and compensated for in real time while the display device 100 is driven so that the quality of a displayed image may be improved.

Various example embodiments of the present disclosure can also be described as follows:

According to an aspect of the present disclosure, a display device may include a display panel including a plurality of sub pixels, wherein at least one of the sub pixels including a light emitting diode configured to emit light, a light emitting circuit configured to drive the light emitting diode, and a sensing circuit including a photo sensing transistor configured to sense light emitted from the light emitting diode.

In some embodiments, the display device may further include a first voltage line connected to a gate electrode of the photo sensing transistor. The first voltage line may be configured to apply a turn-off level voltage to the gate electrode of the photo sensing transistor for turning off the photo sensing transistor.

In some embodiments, the first voltage line may be configured to continuously apply the turn-off level voltage to the gate electrode of the photo sensing transistor.

In some embodiments, the light emitting circuit may include a driving transistor including a gate electrode connected to a first node and a source electrode connected to a second node, an emission control transistor connected between a drain electrode of the driving transistor and a third node, a first transistor having a drain electrode connected to the first node, and a second transistor connected between the third node and a fourth node. The light emitting diode may be connected between the third node and a low-potential power line.

In some embodiments, the sensing circuit may further include a third transistor connected between the fourth node and a fifth node, and a fourth transistor connected between a sensing line and the fifth node. The photo sensing transistor may be connected between the fifth node and the low-potential power line.

In some embodiments, the fifth transistor may include an active layer formed of amorphous silicon.

In some embodiments, at least one of the driving transistor, the emission control transistor, the first transistor, the second transistor, the third transistor, and the fourth transistor may include one of an active layer formed of poly-silicon or an active layer formed of an oxide semiconductor.

In some embodiments, the photo sensing transistor may be configured to flow an off-current in a turned-off state and may be configured to flow a higher off-current with a higher intensity of light incident on the photo sensing transistor.

In some embodiments, the at least one of the sub pixels may be configured to be driven in an order of an initialization period and an emission period including a sensing period. The second transistor and the third transistor may be configured to be turned on during the initialization period to apply an initialization voltage from an initialization line to the third node and the fifth node.

In some embodiments, during the emission period, the photo sensing transistor may be configured to flow the off-current, and a voltage at the fifth node may be configured to decrease. During the sensing period, the fourth transistor may be configured to be turned on to electrically connect the fifth node and the sensing line.

In some embodiments, the sensing period and the emission period may overlap.

In some embodiments, the at least one of the sub pixels may further include a reflective layer disposed between the photo sensing transistor and the light emitting diode.

In some embodiments, the reflective layer may include an opaque conductive layer with an opening, the opening overlapping the photo sensing transistor and the light emitting diode.

In some embodiments, the light emitting circuit may include a driving transistor configured to drive the light emitting diode, and the reflective layer may be electrically connected between the driving transistor and the light emitting diode.

According to another aspect of the present disclosure, a display device may include a substrate, a photo sensing transistor on the substrate, a reflective layer on the photo sensing transistor, and a light emitting diode on the reflective layer. The reflective layer may include an opening overlapping the photo sensing transistor.

In some embodiments, the photo sensing transistor may be configured to sense light emitted from the light emitting diode and incident on the photo sensing transistor through the opening.

In some embodiments, the opening may overlap at least a part of the light emitting diode.

In some embodiments, the display device may further include a light shielding layer disposed between the substrate and the photo sensing transistor. The light shielding layer may overlap the photo sensing transistor.

In some embodiments, the display device may further include a driving transistor on the substrate and electrically connected to the light emitting diode.

In some embodiments, the reflective layer may be electrically connected between the driving transistor and the light emitting diode.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display device, comprising:

a display panel including a plurality of sub pixels, at least one of the sub pixels including:

a light emitting diode configured to emit light;

a light emitting circuit configured to drive the light emitting diode;

a sensing circuit including a photo sensing transistor configured to sense light emitted from the light emitting diode; and a reflective layer disposed between the photo sensing transistor and the light emitting diode, the reflective layer being disposed closer to the photo sensing transistor than a surface of the light emitting diode closest to the photo sensing transistor is, wherein the reflective layer includes an opaque conductive layer with an opening, the opening overlapping the photo sensing transistor and the light emitting diode.

2. The display device of claim 1, further comprising:

a first voltage line connected to a gate electrode of the photo sensing transistor, wherein the first voltage line is configured to apply a turn-off level voltage to the gate electrode of the photo sensing transistor for turning off the photo sensing transistor.

3. The display device of claim 2, wherein the first voltage line is configured to continuously apply the turn-off level voltage to the gate electrode of the photo sensing transistor.

4. The display device of claim 1, wherein the light emitting circuit includes:

a driving transistor including a gate electrode connected to a first node and a source electrode connected to a second node;

an emission control transistor connected between a drain electrode of the driving transistor and a third node;

a first transistor having a drain electrode connected to the first node; and a second transistor connected between the third node and a fourth node, and wherein the light emitting diode is connected between the third node and a low-potential power line.

5. The display device of claim 4, wherein the sensing circuit further includes:

a third transistor connected between the fourth node and a fifth node; and a fourth transistor connected between a sensing line and the fifth node, and wherein the photo sensing transistor is connected between the fifth node and the low-potential power line.

6. The display device of claim 5, wherein the photo sensing transistor includes an active layer formed of amorphous silicon.

7. The display device of claim 6, wherein at least one of the driving transistor, the emission control transistor, the first transistor, the second transistor, the third transistor, and the fourth transistor includes one of an active layer formed of poly-silicon or an active layer formed of an oxide semiconductor.

8. The display device of claim 5, wherein the photo sensing transistor is configured to flow an off-current in a turned-off state and is configured to flow a higher off-current with a higher intensity of light incident on the photo sensing transistor.

9. The display device of claim 8, wherein:

the at least one of the sub pixels is configured to be driven in an order of an initialization period and an emission period including a sensing period; and the second transistor and the third transistor are configured to be turned on during the initialization period to apply an initialization voltage from an initialization line to the third node and the fifth node.

10. The display device of claim 9, wherein:

during the emission period, the photo sensing transistor is configured to flow the off-current, and a voltage at the fifth node is configured to decrease; and during the sensing period, the fourth transistor is configured to be turned on to electrically connect the fifth node and the sensing line.

11. The display device of claim 10, wherein the sensing period and the emission period overlap.

12. The display device of claim 1, wherein:

the light emitting circuit includes a driving transistor configured to drive the light emitting diode; and the reflective layer is electrically connected between the driving transistor and the light emitting diode.

13. The display device of claim 1, wherein the reflective layer is electrically connected to the light emitting diode.

14. The display device of claim 1, further comprising:

an insulating layer on the reflective layer and covering at least a portion of a side surface of the light emitting diode.

15. A display device, comprising:

a substrate;

a photo sensing transistor on the substrate;

a reflective layer on the photo sensing transistor;

a light emitting diode on the reflective layer, the reflective layer being under a bottommost surface of the light emitting diode; and a driving transistor on the substrate and electrically connected to the light emitting diode, wherein the reflective layer includes an opaque conductive layer with an opening, the opening overlapping the photo sensing transistor and the light emitting diode, and wherein the reflective layer is electrically connected between the driving transistor and the light emitting diode.

16. The display device of claim 15, wherein the photo sensing transistor is configured to sense light emitted from the light emitting diode and incident on the photo sensing transistor through the opening.

17. The display device of claim 15, further comprising:

a light shielding layer disposed between the substrate and the photo sensing transistor, wherein the light shielding layer overlaps the photo sensing transistor.

18. The display device of claim 15, wherein the reflective layer is electrically connected to the light emitting diode.

19. The display device of claim 15, further comprising:

an insulating layer on the reflective layer and covering at least a portion of a side surface of the light emitting diode.

* * * * *